Figure 1:
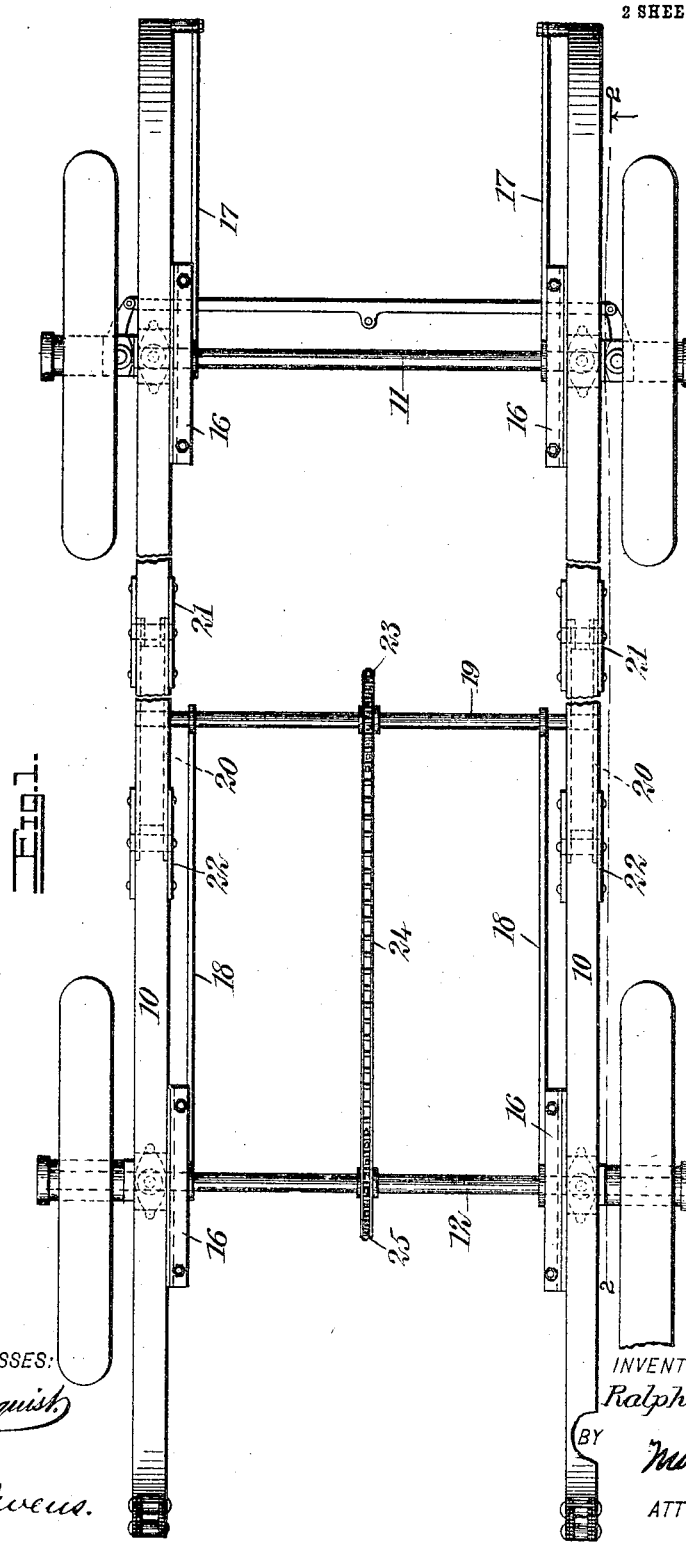

No. 816,282. PATENTED MAR. 27, 1906.
R. B. VAUGHN.
MOTOR VEHICLE RUNNING GEAR.
APPLICATION FILED OCT. 2, 1905.

2 SHEETS—SHEET 1.

WITNESSES:
L. Almquist
Isaac B. Owens.

INVENTOR
Ralph B. Vaughn
BY
Munn
ATTORNEYS

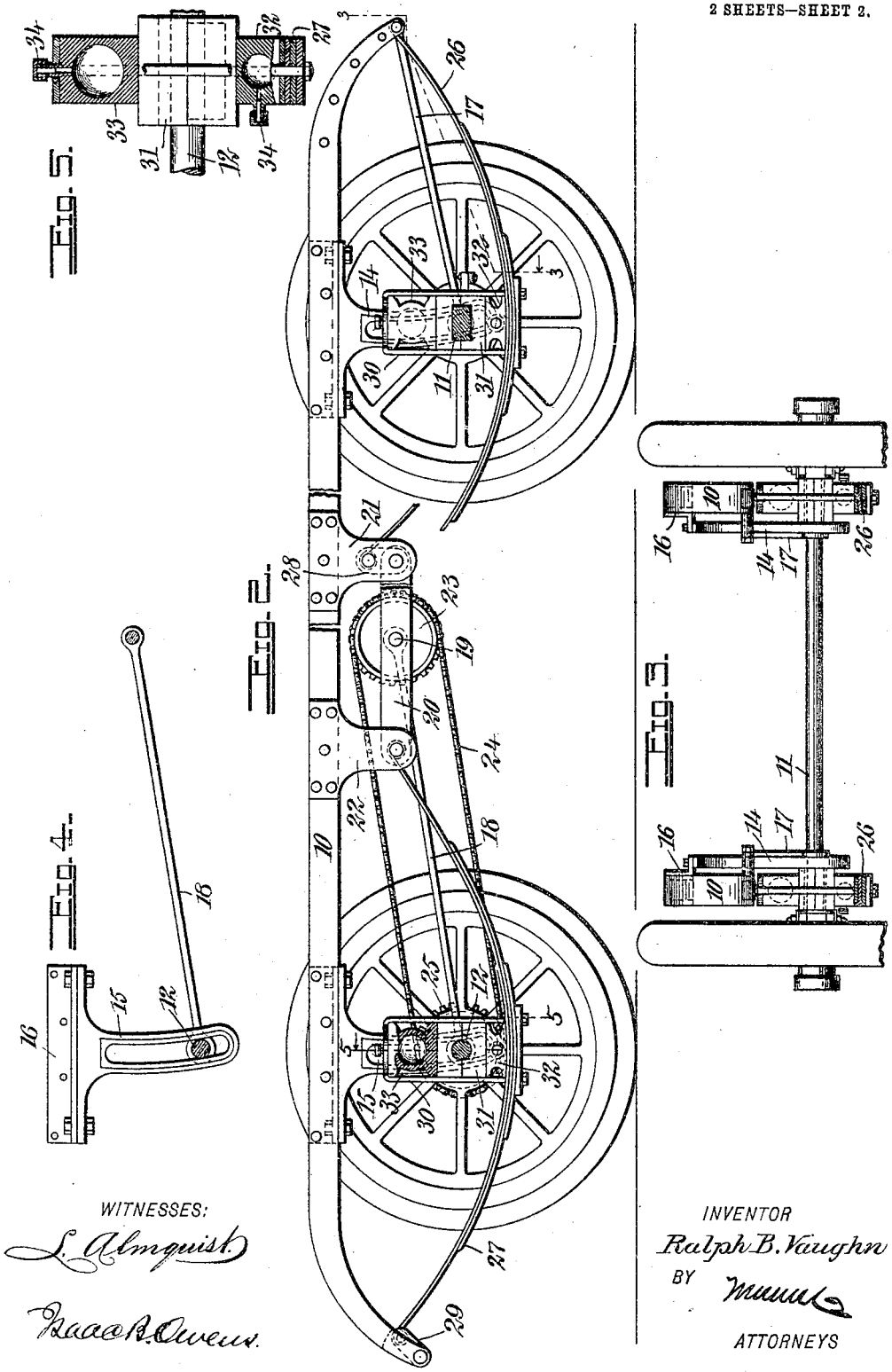

UNITED STATES PATENT OFFICE.

RALPH BROOKS VAUGHN, OF KINGSTON, PENNSYLVANIA.

MOTOR-VEHICLE RUNNING-GEAR.

No. 816,282.   Specification of Letters Patent.   Patented March 27, 1906.

Application filed October 2, 1905. Serial No. 280,991.

*To all whom it may concern:*

Be it known that I, RALPH BROOKS VAUGHN, a citizen of the United States, and a resident of Kingston, in the county of Luzerne and State of Pennsylvania, have invented a new and Improved Motor-Vehicle Running-Gear, of which the following is a full, clear, and exact description.

The leading object of my invention is to so construct the running-gear and frame of a motor-car or other automobile-vehicle as to dispense wholly or in part with the necessity for pneumatic or other cushion tires on the road-wheels.

It is also an object of invention to mount the frame and body so as to permit easy and free movement on the springs, preventing, however, violent and erratic movement.

Other objects of major or minor importance are contemplated, as will fully appear hereinafter.

Reference is to be had to the accompanying drawings, which illustrate as an example the preferred embodiment of my invention, in which drawings—

Figure 1 is a plan view of the frame and running-gear. Fig. 2 is a side view with parts broken away. Fig. 3 is a sectional elevation of the front axle and its connected parts. Fig. 4 is a detail view of one of the radius-bars and hangers, and Fig. 5 is an enlarged section on the line 5 5 of Fig. 2.

10 indicates the longitudinal side bars of the frame, which project beyond the front and rear axles 11 and 12 and have slotted hangers or guides 14 and 15 depending from them to loosely secure the axles, permitting, however, vertical movement of the frame on the axles. According to the specific structure here shown the hangers 14 and 15 are fastened to the frame-bars by angle-irons 16. (See Figs. 3 and 4.) Radius-bars 17 and 18 are connected to the axles at each side of the frame, and the hangers are curved in arcs concentric to the centers of movement of the radius-bars. The radius-bars extend forward from the axles and serve to brace the structure and reinforce the hangers. The front bars 17 are pivoted to the front ends of the frame-bars 10, while the rear radius-bars 18 are hung from a cross-shaft 19, located midway the frame. Said shaft is supported in side plates or members 20, located one at each side of the frame and sustained rigidly by hangers 21 and 22, depending from the frame-bars 10. The cross-shaft 19 carries a gear 23, preferably a sprocket, which receives its motion from the engine. Over the gear runs a chain 24, which passes around a sprocket 25 on the rear axle 12. It will thus appear that the frame and body are free to move with the radius-bars on the axles and that this movement in no way interferes with the drive of the rear axle through the gears 23 and 25 and chain 24, since the radius-bar, being coincident at its ends to the centers of the gears, maintains the parts in correct relation.

The frame and body are sustained on the axle by springs 26 and 27, which are of the half-elliptical form. The front springs 26 are hung on the front ends of the frame-bars 10, pass under the front axle, and are joined at their rear ends by links 28 to the hangers 21. The rear springs 27 are hung at their front ends on the hangers 22, pass under the rear axle, and are joined at their rear ends to links 29, pivoted on the rear ends of the frame-bars 10. Secured to the springs 26 and 27 are yokes 30, which project upward from the springs and embrace the axles 11 and 12. Slidably arranged in these yokes are boxes 31, in which the rear axle is journaled and the front axle mounted. (As here shown, the front axle is of the usual non-rotary form, and hence is merely mounted in its boxes 31.) Arranged in the yokes 30 below the boxes 31 are pneumatic cushion-blocks 32, and above the boxes in the yokes are similar blocks 33. Of these blocks the lower blocks 32 are preferably smaller than the upper blocks, since the latter bear the greater strain. Said blocks are preferably constructed of rubber and, as shown in Fig. 5, are provided with nipples 34, through which the blocks may be inflated. By means of this arrangement the frame and body are not only supported through the springs 26 and 27, but also through the cushions 32 and 33, in such a manner as to insure the easy resilient carriage of the frame and body and to dispense with pneumatic tires in whole or in part, as may be desired. The hangers 14 and 15 and radius-rods 17 and 18 allow free movement of the body under the yielding of the springs without, however, permitting this movement to be violent or erratic.

While pneumatic rubber cushions 32 and 33 are preferably employed, I desire it understood that springs or cushions of other forms may be substituted without departing from my invention.

Having thus described my invention, I claim as new and desire to secure by Letters Patent—

1. In a vehicle, the combination of a frame, an axle, a radius-bar connecting the frame and axle, a hanger fastened to the frame and loosely inclosing the axle, the hanger curving in an arc concentric to the center of movement of the radius-bar, a driving-gear for the axle, said gear including elements the centers of which are respectively coincident to the ends of the radius-bar, a spring fastened to the frame, a yoke connected to the spring, a box in which the axle is mounted, the box sliding in the yoke, and cushions held in the yoke above and below the box.

2. In a vehicle, the combination of a frame, an axle, a radius-bar connecting the frame and axle, a hanger fastened to the frame and loosely inclosing the axle, the hanger curving in an arc concentric to the center of movement of the radius-bar, a driving-gear for the axle, said gear including elements the centers of which are respectively coincident to the ends of the radius-bar, a spring fastened to the frame, a yoke connected to the spring, a box in which the axle is mounted, the box sliding in the yoke, and pneumatic cushions held in the yoke above and below the box.

3. In a vehicle, the combination of a frame, an axle, a radius-bar connecting the frame and axle, a hanger fastened to the frame and loosely receiving the axle, the hanger being curved concentrically to the center of movement of the radius-bar, a gear for driving the axle, the gear including elements respectively coincident with the ends of the radius-bar, a half-elliptic spring having its ends secured to the frame, a yoke carried intermediate the ends of said spring, a box in which the axle is mounted, the box being loosely arranged in the yoke, and cushions held in the yoke above and below the box.

4. In a vehicle, the combination of a frame, an axle, a radius-bar joining the frame and axle, a hanger attached to the frame and loosely receiving the axle, the hanger curving concentrically to the center of movement of the radius-bar, a sprocket-gear arranged with its center coincident to the front end of the radius-bar, a gear mounted on the axle, a chain connecting said gears, a spring secured to the frame, a yoke attached to the spring, a box in which the axle is mounted, said box sliding in the yoke, and cushions held in the yoke above and below the box.

5. In a vehicle, the combination of a frame, a spring attached thereto, a yoke attached to the spring, an axle, a box in which the axle is mounted, said box being carried loosely in the yoke, cushions held by the yoke above and below the box, a driving-shaft connected with the frame, and means for maintaining the driving-shaft and the axle at a fixed distance with respect to each other.

6. In a vehicle, the combination of a frame, a half-elliptic spring having its ends connected to the frame, a yoke carried by the spring intermediate its ends, an axle, a box in which the yoke is mounted, said box being loosely mounted in the yoke, cushions held in the yoke above and below the box, a driving-shaft connected with the frame, and means for maintaining the driving-shaft and the axle at a fixed distance with respect to each other.

7. In a vehicle, the combination of a frame, a half-elliptic spring, one end of which is joined to a rigid part of the frame, a link for joining the other end of the spring to the frame, a yoke carried by the spring intermediate the same, an axle, a box in which the axle is mounted, said box being slidably mounted in the yoke, cushions held in the yoke above and below the box, a driving-shaft connected with the frame, and means for maintaining the driving-shaft and the axle at a fixed distance with respect to each other.

8. In a vehicle, the combination of a frame comprising longitudinal side bars, hangers depending from each and side members extending between the hangers at each side of the frame, a cross-shaft extending between said side members, a radius-bar connected to the cross-shaft, a rear axle connected to the radius-bar, hangers depending from the frame in which the rear axle is loosely arranged, the hangers curving concentrically to the front end of the radius-bar, a gearing for driving the rear axle, the gearing including elements respectively coincident to the axle and the front end of the radius-bar, means including a spring for connecting the rear axle with the frame, a front axle, and means for connecting said axle with the frame.

9. In a vehicle, the combination of a frame, comprising longitudinal side bars, hangers depending from each, and side members extending between the hangers at each side of the frame, a cross-shaft extending between the side members, a radius-bar the front end of which is coincident with said cross-shaft, a rear axle to which the radius-bar is joined, a hanger loosely receiving the axle, the hanger curving concentrically to the front end of the radius-bar, a half-elliptic spring having its front end joined to one of the first-named hangers of the frame and its rear end joined to the rear part of the frame, a yoke attached to the spring intermediate of its ends, means for loosely mounting the axle in the yoke, a front axle, and means for mounting the same.

10. In a vehicle, the combination of a frame, comprising longitudinal side bars, hangers depending from each and side members extending between the hangers at each side of the frame, a cross-shaft extending between the side members, a radius-bar the front end of which is coincident with said cross-shaft, a rear axle to which the radius-bar is joined, a hanger loosely receiving the axle, the hanger curving concentrically to the front end of the radius-bar, a half-elliptic spring having its front end joined to one of the first-named hangers of the frame and its rear end joined to the rear part of the frame, a yoke attached to the spring intermediate its ends, means for loosely mounting the axle in the yoke, a front axle, and means for mounting the same; said means for loosely mounting the axle in the yoke comprising a box in which the axle is arranged, the box sliding in the yoke, and cushions held by the yoke above and below the box.

11. In a vehicle, the combination of a frame, front and rear axles, radius-bars connecting the axles with the frame, hangers secured to the frame, in which hangers the axles are loosely received, said hangers curving in arcs respectively concentric to the centers of movement of the radius-bars, springs connected to the frame, and means for mounting the axles on the springs.

12. In a vehicle, the combination of a frame, front and rear axles, radius-bars connecting the axles with the frame, hangers secured to the frame, in which hangers the axles are loosely received, said hangers curving in arcs respectively concentric to the centers of movement of the radius-bars, springs connected to the frame, and means for mounting the axles on the springs; said means for mounting the axles on the springs comprising yokes connected with the springs, boxes in which the axles are mounted, and cushions held by the yokes above and below the boxes.

13. In a vehicle, the combination of a frame, an axle, a radius-bar connecting the frame and axle, a curved hanger attached to the frame and loosely receiving the axle, a half-elliptic spring having its ends in connection with the frame, and means for connecting the intermediate portion of the spring with the axle.

14. In a vehicle, the combination of a frame, comprising longitudinal side bars, hangers depending from the middle portion of each and side members connecting the hangers at each side, front and rear axles, curved hangers depending from the side bars of the frame, in which hangers the axles are loosely arranged, radius-bars connecting the axles with the frame, half-elliptic springs having their front ends joined to the frame and their rear ends linked to the front hangers of the frame, means connecting said springs with the front axle, additional half-elliptic springs having their front ends joined to the rear hangers of the frame, links connecting the rear ends of the additional springs with the frame, and means for connecting said additional springs with the rear axle.

15. In a vehicle, the combination of a frame, comprising longitudinal side bars, hangers depending from the middle portion of each and side members connecting the hangers at each side, front and rear axles, curved hangers depending from the side bars of the frame, in which hangers the axles are loosely arranged, radius-bars connecting the axles with the frame, half-elliptic springs having their front ends joined to the frame and their rear ends linked to the front hangers of the frame, means connecting said springs with the front axle, additional half-elliptic springs having their front ends joined to the rear hangers of the frame, links connecting the rear ends of the additional springs with the frame, and means for connecting said additional springs with the rear axle; said means for connecting said springs with the front and rear axles comprising yokes attached to the springs, boxes in which the axles are mounted, the boxes sliding in the yokes, and cushions held in the yokes above and below the boxes.

In testimony whereof I have signed my name to this specification in the presence of two subscribing witnesses.

RALPH BROOKS VAUGHN.

Witnesses:
PETER FRITZ, 4th,
W. L. SPUCE.